United States Patent
Ohyama et al.

(10) Patent No.: US 10,637,353 B2
(45) Date of Patent: Apr. 28, 2020

(54) FEEDBACK VOLTAGE DC LEVEL CANCELLING FOR CONFIGURABLE OUTPUT DC-DC SWITCHING CONVERTERS

(71) Applicant: Dialog Semiconductor (UK) Limited, London (GB)

(72) Inventors: Soichiro Ohyama, Kanagawa (JP); Hidechika Yokoyama, Tokyo (JP); Andrey Malinin, Fort Collins, CO (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/365,048

(22) Filed: Nov. 30, 2016

(65) Prior Publication Data
US 2018/0152105 A1    May 31, 2018

(51) Int. Cl.
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 2001/0009* (2013.01); *H02M 2001/0025* (2013.01)

(58) Field of Classification Search
CPC ......... H02M 2003/1566; H02M 3/156; H02M 3/158; H02M 3/1588; H02M 3/155; H02M 3/1582; H02M 3/1563; H02M 2003/1557; H02M 3/157; H02M 3/1584; H02M 2001/0012; H02M 2001/0009; H02M 2001/385

USPC ................................. 323/312–317, 282–285
See application file for complete search history.

(56) References Cited

U.S. PATENT DOCUMENTS

| | | | |
|---|---|---|---|
| 5,430,765 A | 7/1995 | Nagahori | |
| 6,297,622 B1 * | 10/2001 | Yatabe | H02M 3/156 323/222 |
| 7,092,265 B2 | 8/2006 | Kemahan | |
| 7,382,114 B2 | 6/2008 | Groom | |
| 8,710,810 B1 * | 4/2014 | McJimsey | H02M 3/1584 323/272 |
| 2005/0200342 A1 * | 9/2005 | Rudiak | H02M 3/1588 323/282 |
| 2009/0153114 A1 * | 6/2009 | Huang | H02M 3/1584 323/282 |

(Continued)

OTHER PUBLICATIONS

Reza Moghimi, Ask the applications engineer-31: Amplifiers as comparators? (Apr. 2003). Retrieved from http://www.analog.com/en/analog-dialogue/articles/amplifiers-as-comparators.html.*

*Primary Examiner* — Bryan R Perez
(74) *Attorney, Agent, or Firm* — Saile Ackerman LLC; Stephen B. Ackerman

(57) ABSTRACT

A system is disclosed which provides feedback voltage DC level cancelling for a configurable output of a DC-DC switching converter. By simplifying the design, the operational amplifier can be used for a wider output voltage range. Extension of the usage case to a Boost DC-DC switching converter can give noticeable performance improvements. Offset introduction using a flying capacitor is attractive because it does not require trimming. The proposal also allows for improvements for DC-DC switching converters designed for lower supply voltages, with no decrease in the differential input signal swing.

13 Claims, 10 Drawing Sheets

(56) References Cited

U.S. PATENT DOCUMENTS

| | | | |
|---|---|---|---|
| 2011/0316518 A1* | 12/2011 | Feng | H02M 3/156 323/349 |
| 2012/0153910 A1* | 6/2012 | Bulzacchelli | G05F 1/575 323/272 |
| 2012/0299560 A1* | 11/2012 | Gu | H02M 3/1584 323/212 |
| 2014/0139198 A1* | 5/2014 | Manlove | H02M 3/156 323/282 |
| 2016/0248380 A1* | 8/2016 | Lee | H03F 1/0205 |

* cited by examiner

FEEDBACK VOLTAGE DC LEVEL CANCELLING FOR CONFIGURABLE OUTPUT DC-DC SWITCHING CONVERTERS

BACKGROUND

Field

The disclosure relates generally to feedback voltage in DC-DC switching converters.

Description of Related Art

DC-DC switching converters such as Buck switching converters, Buck-Boost switching converters, and Boost switching converters are basic building blocks of power management systems.

FIG. 1 illustrates basic topology 100 of a DC-DC switching converter, of the prior art. Supply voltage VDAC 110 and output voltage VOUT 180 supply the inverting and non-inverting inputs respectively, of Error Amplifier 120. Error Amplifier 120 provides the input to Error Amp Dist 140, where the output of Error Amp Dist 140 and Ramp gen 130 supply the inputs to Pulse-width modulation (PWM) Logic 150. The output of PWM Logic 150 supplies input signals to logic LXIA Logic 155, where LXIA Logic 155 includes current sensing, positive and negative current limits, and high-side device 160 and low-side device 170, which determine output voltage VOUT 180, across inductor LX1A.

FIG. 2 shows example 200 of a DC-DC switching converter, with a wider input and output voltage range, of the prior art. In this case, the input to supply voltage VDAC 110 and output voltage VOUT 180, on feedback FB, can range from 0.3V to 2.2V. A PMOS input device pair serves as inputs to Error Amplifier 120, across which a wider input and output voltage range is required. Error Amplifier 120 provides the input to Error Amp Dist 140, and Error Amp Dist 140 and Ramp gen 130 supply the inputs to Pulse-width modulation (PWM) Logic 150.

The example of FIG. 2 may be improved by modifying the error amplifier, but there are limitations of its practice. To reduce costs, the use of low voltage transistors is minimized, along with the resulting architecture. In addition, the compensation circuitry of the error amplifier, including functionality to support practical power management products, increases complexity. The wider input range required on the supply voltage makes it difficult to maintain a constant transconductance, affecting loop stability at worst case. As a result, power consumption and silicon area increase.

SUMMARY

An object of the disclosure is to provide a DC-DC switching converter offset circuit, for DC level cancelling in a DC-DC switching converter.

Further, another object of this disclosure is to support a wide output voltage range on a feedback error amplifier, of the DC-DC switching converter offset circuit.

Still another object of the disclosure is to provide a flexible current gain for the output voltage, of a DC-DC switching converter.

Still another object of the disclosure is to implement the voltage offset using a switching capacitor circuit, sampling the input of the error amplifier on an intermediate capacitor, and using AC coupling to add an offset voltage.

To accomplish the above and other objects, a DC-DC switching converter offset circuit is disclosed, comprised of a VDAC, configured to provide a supply voltage and a reference voltage. The DC-DC switching converter offset circuit is further comprised of a difference circuit, configured to provide an offset voltage from the output feedback voltage and the reference voltage. The DC-DC switching converter offset circuit is further comprised of an error amplifier circuit, configured to receive the offset voltage and the reference voltage, and a voltage to current conversion circuit, configured to provide a flexible current gain.

The above and other objects are further achieved by a method for feedback voltage DC level cancelling for configurable output DC-DC switching converters. The steps include providing a voltage offset to the feedback error amplifier of a DC-DC switching converter. Supporting a wide output voltage range for the DC-DC switching converter is provided. A flexible current gain for a higher output voltage is provided. Implementing the voltage offset using a switching capacitor circuit, sampling the input of the error amplifier on an intermediate capacitor, and using AC coupling to add an offset voltage is provided.

In various embodiments the function may be achieved by implementing a Buck, Buck-Boost, or Boost DC-DC switching converter.

In various embodiments the function may be achieved by implementing feedback voltage DC level cancelling for a single phase DC-DC switching converter.

In various embodiments the function may be achieved by implementing feedback voltage DC level cancelling for a multiple phase DC-DC switching converter.

DETAILED DESCRIPTION

There are several alternatives, for feedback voltage DC level cancelling, when using a Buck DC-DC switching converter, including a rail-to-rail amplifier and a resistive divider. For a Boost DC-DC switching converter, a resistive divider is the most likely alternative. The disclosure will give significant advantages, including improvement of the standby current of the switching converter, and a higher system performance, where the output voltage is higher than any other available power rail in the system.

Figure 1:
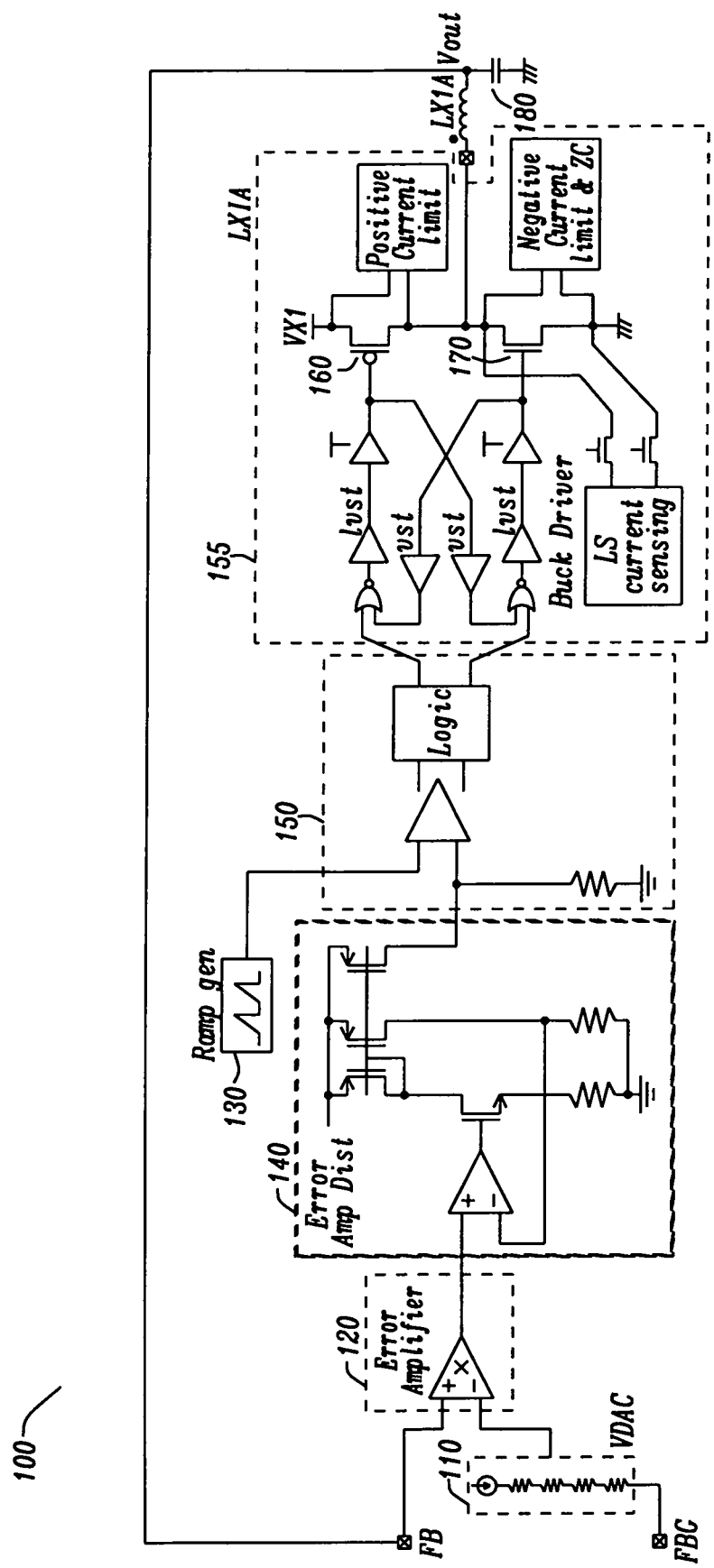
FIG. 1 illustrates a basic topology of a DC-DC switching converter, of the prior art.
Figure 2:
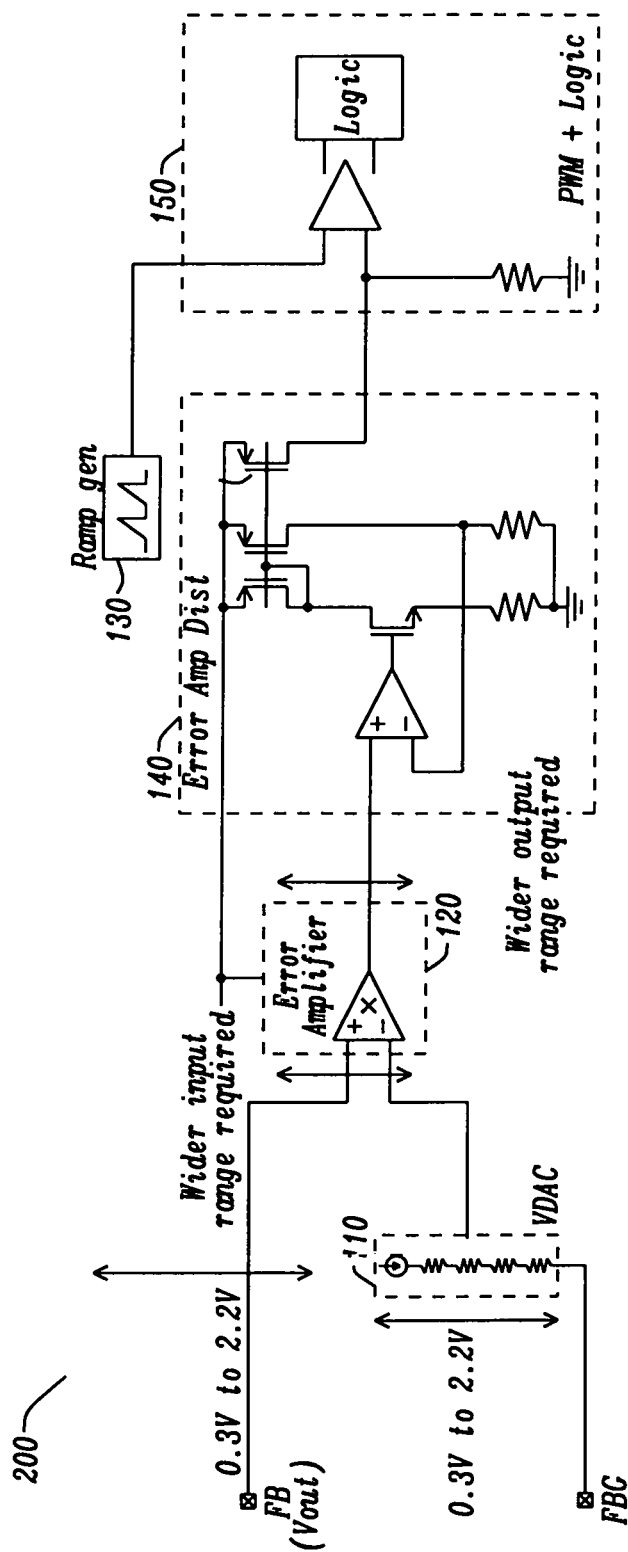
FIG. 2 shows an example of a DC-DC switching converter, with a wider input and output voltage range, of the prior art.
Figure 3:
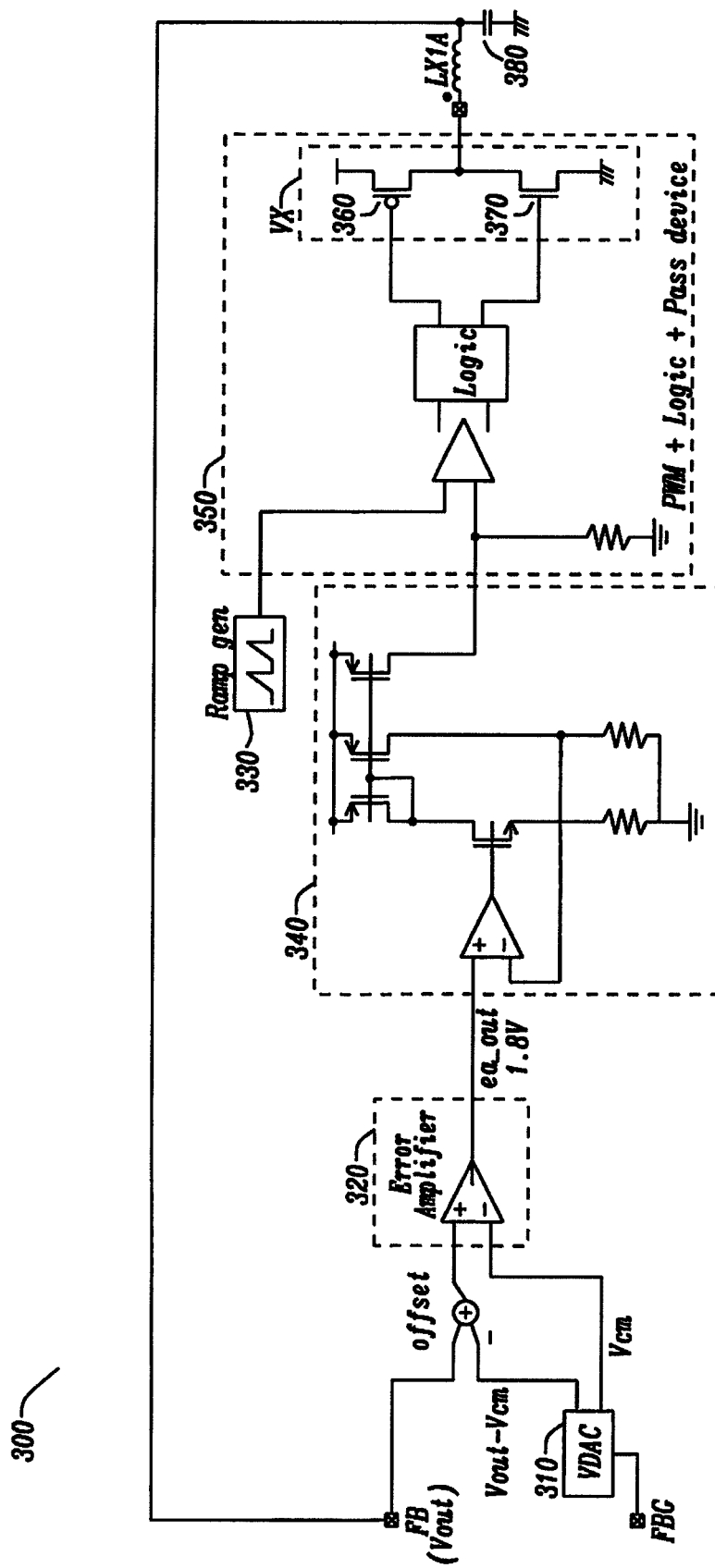
FIG. 3 illustrates a block diagram of the feedback voltage DC level cancelling, for a single phase configurable output DC-DC switching converter, embodying the principles of the disclosure.

FIG. 3 illustrates block diagram 300 of feedback voltage DC level cancelling, for a single phase configurable output DC-DC switching converter, embodying the principles of the disclosure. Voltage digital to analog converter VDAC 310 and output voltage VOUT 380 provide offset VOUT-VCM to the non-inverting input of Error Amplifier 320. VDAC 310 supplies reference voltage VCM to the inverting input of Error Amplifier 320, and error amplifier output EA_OUT, 1.8V, supplies the input to Error Amp Dist 340, which distributes the voltage to current conversion and provides a flexible current gain. Error Amp Dist 340 and Ramp gen 330 supply the inputs to Pulse-width modulation (PWM) Logic 350, where PWM Logic 350 includes highside device 360 and low-side device 370, and output voltage VOUT 380 across inductor LX1A.

A flexible current gain moves the output of error amplifier higher or lower, supplying a higher or lower output voltage. In this way, the current gain helps optimize the overall voltage range of the switching converter.

Additional difference circuitry can be added to the offset to support a wider output voltage range, when a switched capacitor type offset circuit topology is used. The input of the error amplifier may be sampled on an intermediate capacitor, and arrive exponentially to a hold capacitor. By means of AC coupling, an offset is exponentially added to the input of the error amplifier, and a feedback voltage penetrates continuously, minimizing any phase delay.

Figure 4:
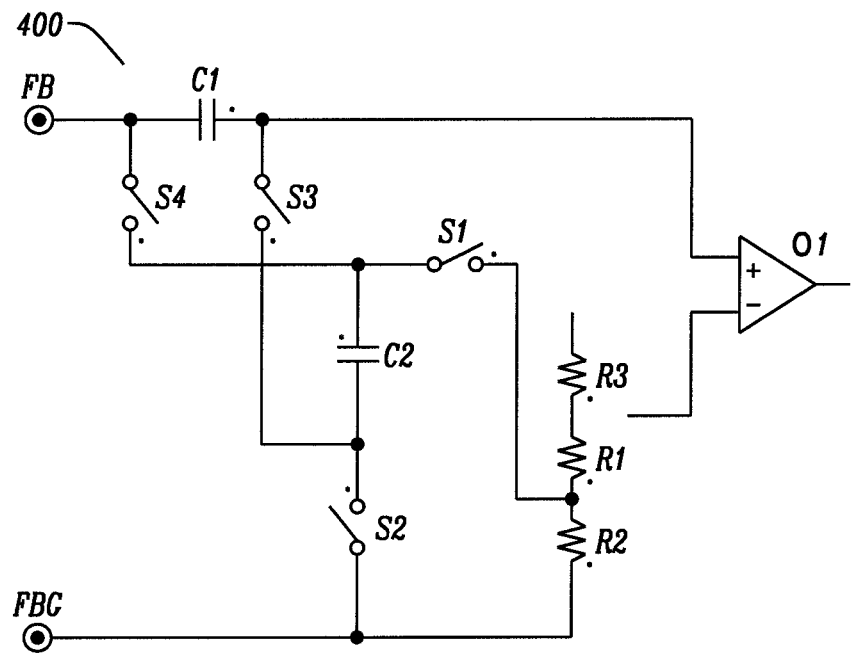
FIG. 4 shows a circuit diagram implementation, using a switched capacitor type offset circuit topology for a multiple phase configurable output DC-DC switching converter, embodying the principles of the disclosure.

FIG. 4 shows circuit diagram implementation 400, using a switched capacitor type offset circuit topology for a multiple phase configurable output DC-DC switching converter, embodying the principles of the disclosure. The output voltage of the DC-DC switching converter is feedback voltage FB, across capacitor C1, supplying the non-inverting input of error amplifier O1. The voltage on resistive divider R3-R1-R2 supplies the inverting input of error amplifier O1.

The sampled feedback voltage transmits to amplifier O1 in one cycle, and the value on intermediate capacitor C2 exponentially arrives to hold capacitor C1. In this way, the offset applied to the feedback voltage is added through the AC coupling of capacitors C1 and C2.

Sampling of feedback voltage FB may create a phase delay, and affect the load line transition specification. In practice, a wider output voltage range can cause the error amplifier to become less than ideal over process, temperature, and supply conditions. A faster sampling time for the feedback voltage will improve these conditions, and minimize any phase shift.

Figure 5:
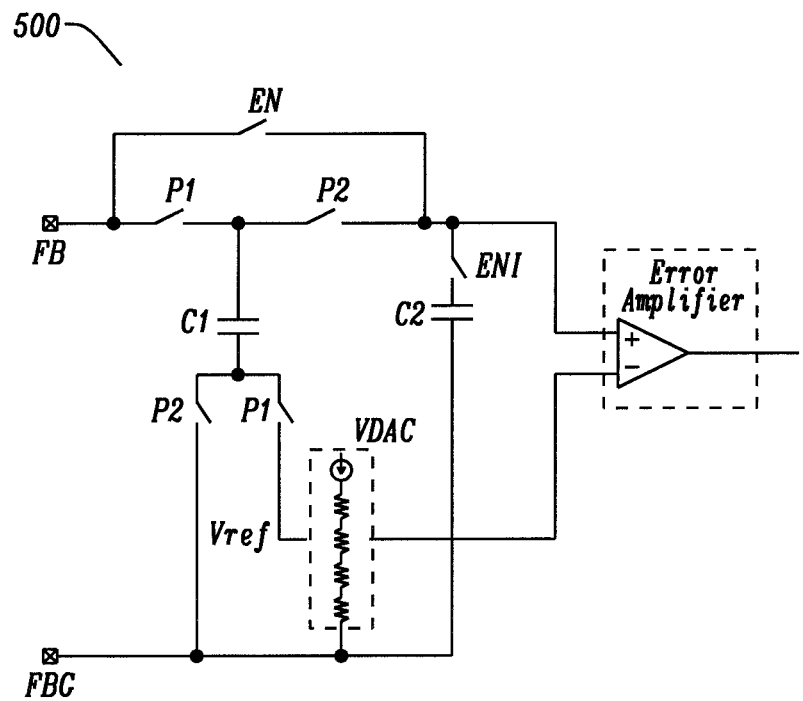
FIG. 5 illustrates an example of the operation of the feedback voltage offset, embodying the principles of the disclosure.

FIG. 5 illustrates example 500 operation of the feedback voltage offset, embodying the principles of the disclosure. Switch EN is open when the feedback voltage offset function is enabled, and closed when the feedback voltage offset function is disabled. When the feedback voltage offset is operating in Phase 1, switch P1 is closed, and when the feedback voltage offset is operating in Phase 2, switch P2 is closed. The output voltage of the switching converter is feedback voltage FB, and the VDAC voltage may be trimmed, with a method known in the prior art, when setting the offset voltage.

The Phase 1 and Phase 2 are non-overlapped clock timings, and the frequency will depend on the load transition specification. Practically, a frequency larger than the loop switching frequency is required, and the system clocks may be two to four times faster than the switching frequency of the loop. A faster sampling time will improve any delay introduced by the phases.

When Phase 1 switch P1 is closed, feedback voltage FB charges capacitor C1, providing reference voltage VREF to the input of VDAC. When Phase 2 switch P2 is closed, capacitor C1 couples with capacitor C2, to determine the offset of the feedback voltage on the non-inverting input of the error amplifier. The VDAC output voltage supplies the input of the inverting input of the error amplifier.

Figure 6:
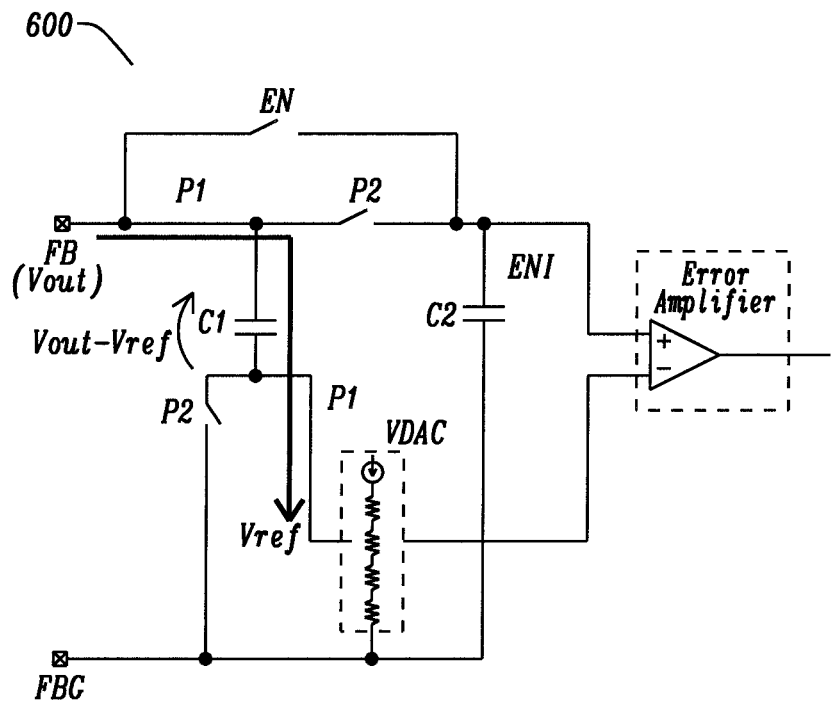
FIG. 6 illustrates an example of Phase 1 operation of the feedback voltage offset, embodying the principles of the disclosure.

FIG. 6 illustrates example 600, Phase 1 operation of the feedback voltage offset, embodying the principles of the disclosure. Capacitor C1 samples the feedback voltage FB, from the output voltage of the DC-DC switching converter, providing the reference voltage VREF to the input of VDAC. The voltage difference, VOUT-VREF, when both P1 and enable switch ENI are closed, is charged across C1.

Figure 7:
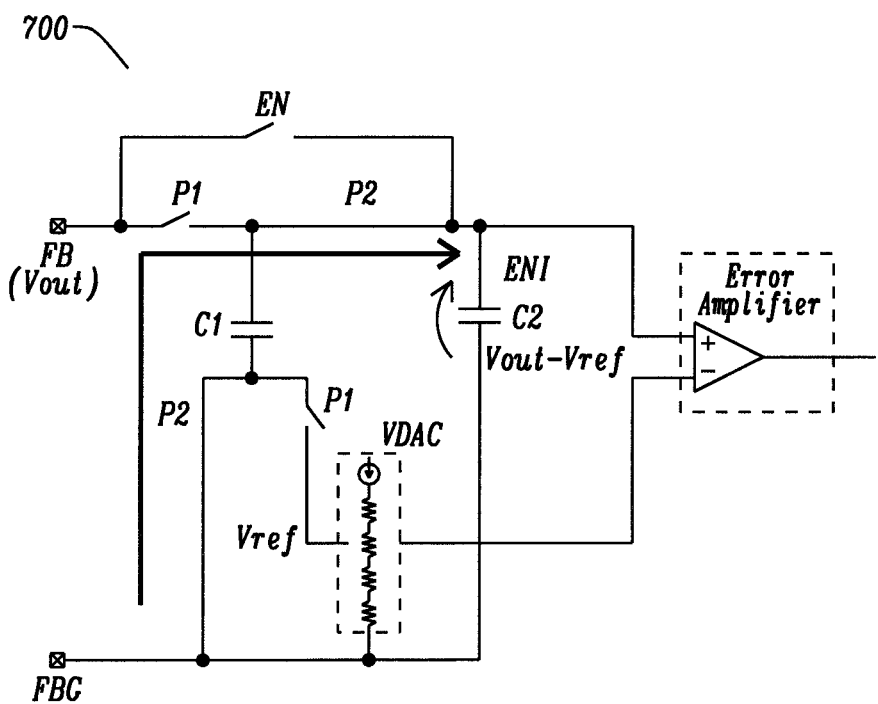
FIG. 7 illustrates an example of Phase 2 operation of the feedback voltage offset, embodying the principles of the disclosure.

FIG. 7 illustrates example 700, Phase 2 operation of the feedback voltage offset, embodying the principles of the disclosure. When both P2 and enable switch ENI are closed, the charge on capacitor C1 transfers to C2. The voltage on capacitor C2 becomes $((C1*C2)/(C1+C2))*(VOUT-VREF)$, where voltage VOUT-VREF is the non-inverting input of the error amplifier.

The disclosure works to provide a relaxation of the error amplifier design, using existing components to avoid complexity. Capacitor size and sampling frequency determine the transient response. The switched capacitor offset circuit is adjustable, where the resistive divider provides a flexible current gain. The offset circuit can increase the output voltage range, without error amplifier limitation, until an output DC limit is reached. A constant transconductance and current consumption is maintained, reducing overall power consumption.

Figure 8:
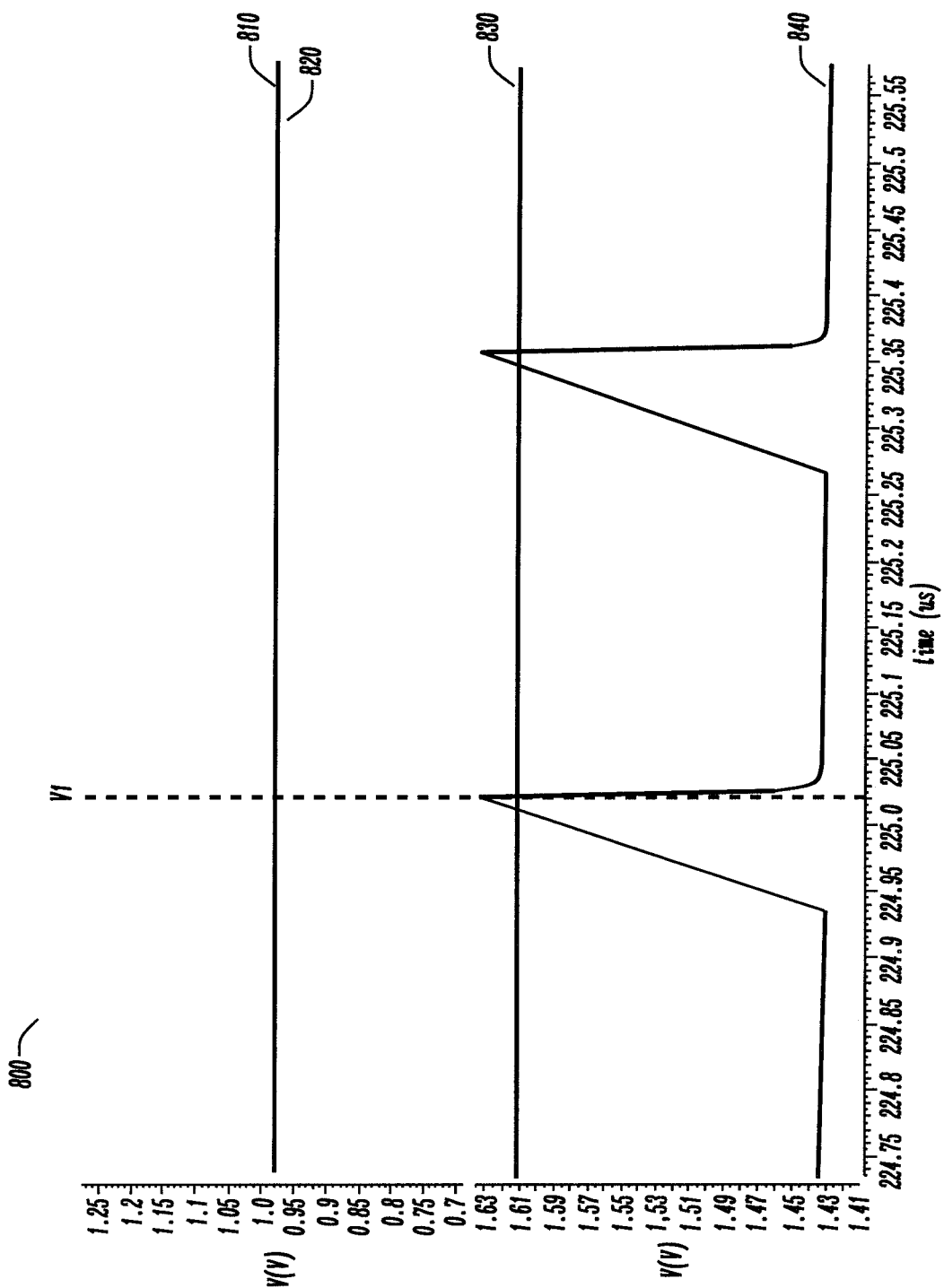
FIG. 8 shows a simulation of a Buck DC-DC switching converter with a single phase, where VDAC=0.982V and no offset function is used.
Figure 9:
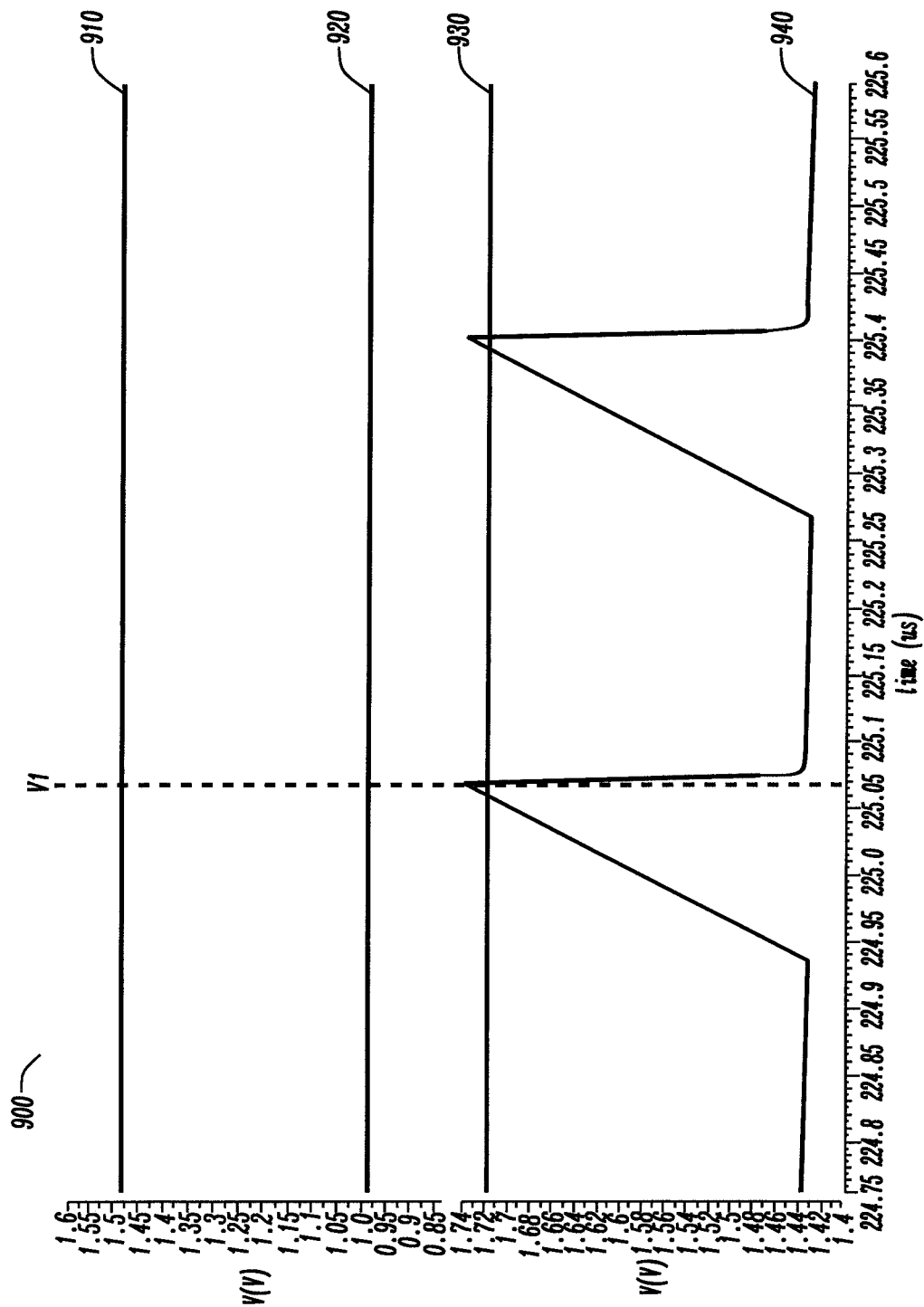
FIG. 9 shows a simulation of a Buck DC-DC switching converter with a single phase, where VDAC=0.982V and a 0.5V offset function is used.
Figure 10:
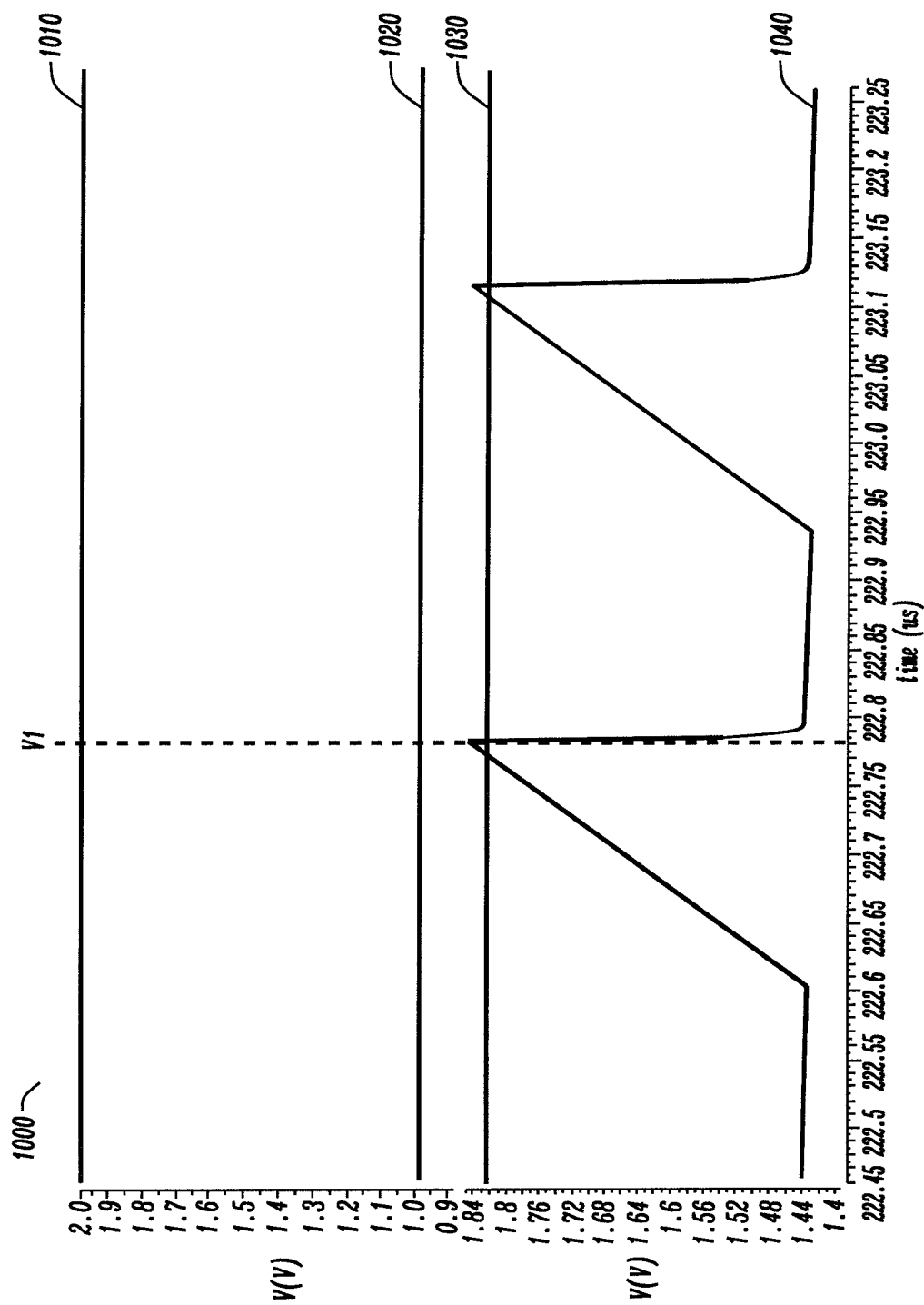
FIG. 10 shows a simulation of a Buck DC-DC switching converter with single phase, where VDAC=0.982V and a 1.0V offset function is used.
Figure 11:
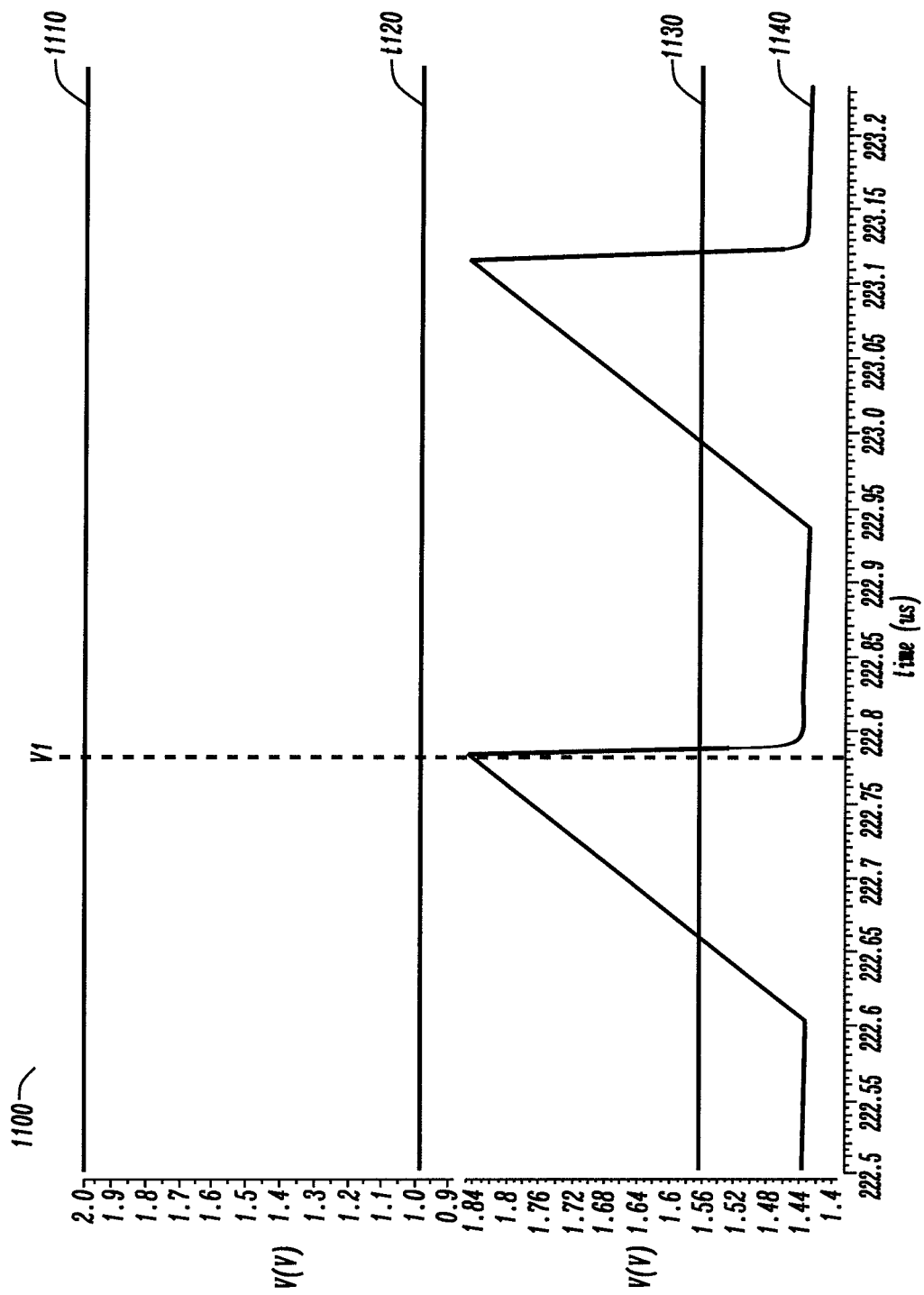
FIG. 11 shows a simulation of a Buck DC-DC switching converter with single phase, where VDAC=0.982V and a 1.0V offset function is used, with an additional current gain of 1.1.

FIGS. 8-11 show test cases based on a Buck DC-DC switching converter with a single phase, as illustrated in the block diagram of FIG. 3. Note that the offset function can add both positive offset, as shown in FIGS. 9-11, and negative offset. The conditions are for VDDA=3.3V, VX (pass device)=3.7V, nominal process, room temperature, and switching frequency fsw=3 MHz. The offset circuit uses the same clock as the control clock, and could be different, to allow some flexibility in the clock scheme.

FIG. 8 shows simulation 800, of a Buck DC-DC switching converter with a single phase, where VDAC=0.982V and no offset function is used. In this case, input to the Error Amplifier, VDAC_OUT 820, is 0.982V. The output of the Error Amplifier, EA_OUT 830, is 1.610V, supplying Error Amp Dist and PWM logic. The output of Ramp gen, RAMP_GEN 840, is 1.587V, and VOUT 810 is 0.982V.

FIG. 9 shows simulation 900, of a Buck DC-DC switching converter with a single phase, where VDAC=0.982V and a 0.5V offset function is used. In this case, input to the Error Amplifier, VDAC_OUT 920, is 0.982V. The output of the Error Amplifier, EA_OUT 930, is 1.717V, supplying Error Amp Dist and PWM logic. The output of Ramp gen, RAMP_GEN 940, is 1.739V, and VOUT 910 is 1.483V. Simulation 900 illustrates how the offset circuit works properly without any VDAC control loop setting change.

FIG. 10 shows simulation 1000, of a Buck DC-DC switching converter with a single phase, where VDAC=0.982V and a 1.0V offset function is used. In this case, input to the Error Amplifier, VDAC_OUT 1020, is 0.982V. The output of the Error Amplifier, EA_OUT 1030, is 1.825V, supplying Error Amp Dist and PWM logic. The output of Ramp gen, RAMP_GEN 1040, is 1.763V, and VOUT 1010 is 1.982V. Simulation 1000 illustrates how the offset circuit works properly without any VDAC control loop setting change.

FIG. 11 shows simulation 1100, of a Buck DC-DC switching converter with a single phase, where VDAC=0.982V and a 1.0V offset function is used, with an additional current gain of 1.1. In this case, input to the Error Amplifier, VDAC_OUT 1120, is 0.982V. The output of the Error Amplifier, EA_OUT 1130, is 1.565V, supplying Error Amp Dist and PWM logic. The output of Ramp gen, RAMP_GEN 1140, is 1.849V, and VOUT 1010 is 1.982V. FIG. 11 is has the same conditions as FIG. 10, except for the additional current gain of 1.1. The voltage to current conversion of Error Amp Dist helps control the Error Amplifier output voltage, adding flexibility to the design. As a result, the error amplifier output is shifted down from 1.825V to 1.565V.

Figure 12:
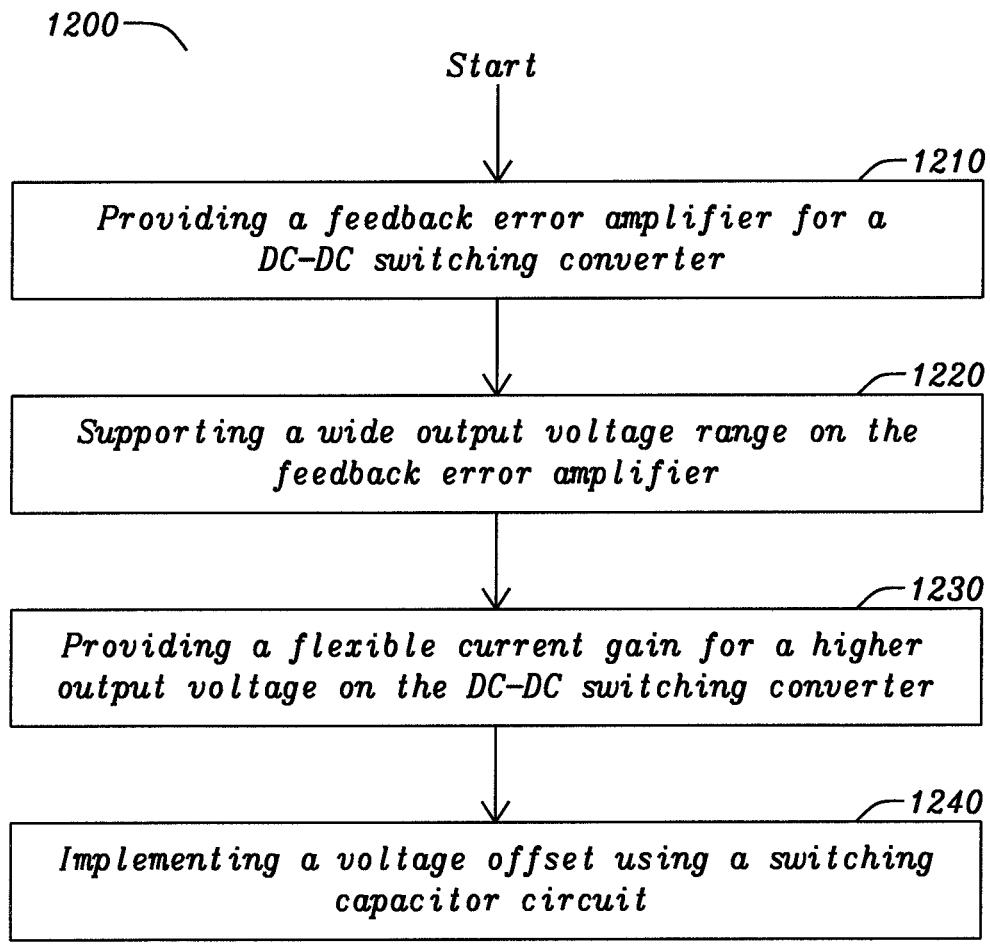
FIG. 12 is flow chart of a method for feedback voltage DC level cancelling, for configurable output DC-DC switching converters, embodying the principles of the disclosure.

FIG. 12 is flow chart 1200, for a method for feedback voltage DC level cancelling, for configurable output DC-DC switching converters, embodying the principles of the disclosure. Step 1210 shows providing a feedback error amplifier for a DC-DC switching converter. Step 1220 shows supporting a wide output voltage range on the feedback error amplifier. Step 1230 shows providing a flexible current gain for a higher output voltage on the DC-DC switching converter. Step 1240 shows implementing a voltage offset using a switching capacitor circuit, sampling the input of the error amplifier on an intermediate capacitor, and using AC coupling to add the offset voltage.

The advantages of one or more embodiments of the present disclosure include the use of conventional DC-DC switching converter architecture targeted to 0.3V-1.5V for the output voltage range, increasing the range without modification to the control loop. The proposal also allows for improved switching, optimizing the input voltage range supplied to a simplified error amplifier circuit. A constant performance is maintained and stability improved, with no change in the differential input signal swing.

While this invention has been particularly shown and described with reference to the preferred embodiments thereof, it will be understood by those skilled in the art that various changes in form and details may be made without departing from the spirit and scope of the invention.

The invention claimed is:

1. A DC-DC switching converter circuit, comprising: a voltage digital to analog converter, VDAC, configured to provide a VDAC voltage determined by a reference voltage;
   a difference circuit, comprising a switched capacitor type offset circuit, configured to provide an offset voltage determined by a difference between an output feedback voltage and said VDAC voltage; and
   an error amplifier circuit, configured to receive said offset voltage on a non-inverting input, and said VDAC voltage on an inverting input,
   wherein said output feedback voltage is transmitted to said error amplifier circuit in one cycle and said output feedback voltage on an intermediate capacitor is configured to exponentially arrive to a hold capacitor within said switched capacitor type offset circuit.

2. The DC-DC switching converter circuit of claim 1, wherein said DC-DC switching converter is configured for a single phase.

3. The DC-DC switching converter circuit of claim 1, wherein a resistive divider is configured to generate said VDAC voltage to said error amplifier circuit.

4. The DC-DC switching converter circuit of claim 1, wherein said offset voltage is added to said output feedback voltage through an AC coupling of said intermediate capacitor and said hold capacitor.

5. The difference circuit of claim 1, wherein said switched capacitor type circuit comprises an intermediate capacitor and a hold capacitor, wherein said intermediate capacitor is configured with a voltage difference between said output feedback voltage and said reference voltage during a first switching period, and said hold capacitor is configured to have said voltage difference transferred to it during a second switching period.

6. The DC-DC switching converter circuit of claim 1, wherein said DC-DC switching converter comprises a Buck, Buck-Boost, or Boost switching converter.

7. The DC-DC switching converter circuit of claim 1, wherein said DC-DC switching converter is configured to increase an range of the output feedback voltage.

8. The DC-DC switching converter circuit of claim 1, wherein said DC-DC switching converter is configured to decrease an range of an input voltage.

9. The DC-DC switching converter circuit of claim 1, wherein said DC-DC switching converter is configured to maintain constant transconductance.

10. The DC-DC switching converter circuit of claim 1, wherein a voltage to current conversion circuit, connected at an output of said error amplifier circuit, is configured for a current gain.

11. A method for feedback voltage DC level cancelling, for configurable output DC-DC switching converters, comprising:
    providing a voltage digital to analog converter, VDAC, voltage determined by a reference voltage;
    providing an offset voltage, determined by a difference between an output feedback voltage and said VDAC voltage, with a difference circuit comprising a switched capacitor type offset circuit; and
    receiving said offset voltage on a non-inverting input, and said VDAC voltage on an inverting input, with an error amplifier circuit,
    wherein said output feedback voltage transmits to said error amplifier circuit in one cycle, and said output feedback voltage on an intermediate capacitor exponentially arrives to a hold capacitor within said switched capacitor type offset circuit.

12. The method of claim 11, wherein said DC-DC switching converter operates with a single phase.

13. The method of claim 11, wherein said offset voltage adds to said output feedback voltage through an AC coupling of said intermediate capacitor and said hold capacitor.

* * * * *